United States Patent
Talcott (10) Patent No.: US 12,037,909 B2
(45) Date of Patent: Jul. 16, 2024

(54) LASER AND MECHANICAL BORING

(71) Applicant: David Talcott, San Antonio, TX (US)

(72) Inventor: David Talcott, San Antonio, TX (US)

( * ) Notice: Subject to any disclaimer, the term of this patent is extended or adjusted under 35 U.S.C. 154(b) by 329 days.

(21) Appl. No.: 17/290,247

(22) PCT Filed: Oct. 31, 2019

(86) PCT No.: PCT/US2019/059146
§ 371 (c)(1),
(2) Date: Apr. 29, 2021

(87) PCT Pub. No.: WO2020/092759
PCT Pub. Date: May 7, 2020

(65) Prior Publication Data
US 2022/0018252 A1 Jan. 20, 2022

Related U.S. Application Data (60) Provisional application No. 62/753,790, filed on Oct. 31, 2018.

(51) Int. Cl.
*E21C 37/16* (2006.01)
*E21B 7/14* (2006.01)
*E21D 9/10* (2006.01)

(52) U.S. Cl.
CPC ............ *E21D 9/1073* (2013.01); *E21C 37/16* (2013.01)

(58) Field of Classification Search
CPC ... E21B 7/14; E21B 7/146; E21B 7/15; E21B 25/00; E21D 9/1073; B23K 26/382; B23K 26/388; E21C 37/16; E21C 37/18; E21C 37/20

USPC .................. 299/14; 405/131; 175/11, 15, 16
See application file for complete search history.

(56) References Cited

U.S. PATENT DOCUMENTS

| | | | | |
|---|---|---|---|---|
| 2,426,688 A | * | 9/1947 | Higgs | E21C 37/16 299/95 |
| 2,876,996 A | * | 3/1959 | Hildebrandt | E21B 25/06 175/255 |
| 3,245,721 A | * | 4/1966 | Margiloff | H05H 1/42 125/1 |
| 3,539,221 A | * | 11/1970 | Gladstone | E21C 37/18 125/1 |

(Continued)

OTHER PUBLICATIONS

International Search Report and Written Opinion issued in corresponding International Application No. PCT/US19/59146 on Feb. 19, 2020, 8 pages.

*Primary Examiner* — Sunil Singh
(74) *Attorney, Agent, or Firm* — Kammer Browning PLLC (57) ABSTRACT

A boring method is provided and can include directing a laser beam at an exposed face of a bulk target in a longitudinal direction. The laser beam can be configured to liquefy and/or gasify the target within the laser beam. The method can also include removing, by the laser beam, a channel of predetermined length and width within the target. The method can further include moving the laser beam in a closed loop of predetermined diameter to define a cut portion of the target laterally bounded by the closed loop. A ligament of the cut portion can remain attached to the target. The method can additionally include separating the ligament from the target. The method can also include removing the cut portion from the target after separating the ligament to form a bore.

18 Claims, 10 Drawing Sheets

(56) References Cited

U.S. PATENT DOCUMENTS

| | | | |
|---|---|---|---|
| 3,608,967 A * | 9/1971 | Vasselin | E21C 37/16 299/14 |
| 3,788,703 A * | 1/1974 | Thorpe | E21C 37/16 299/14 |
| 4,020,317 A * | 4/1977 | Colgate | B23K 15/08 219/121.33 |
| 4,066,138 A * | 1/1978 | Salisbury | B23K 26/082 299/14 |
| 2005/0242654 A1 * | 11/2005 | Fecteau | E21C 41/16 299/14 |
| 2015/0129203 A1 | 5/2015 | Deutch et al. | |
| 2016/0312587 A1 | 10/2016 | Montaron et al. | |
| 2017/0275960 A1 | 9/2017 | Linetskiy | |

* cited by examiner

LASER AND MECHANICAL BORING

CROSS-REFERENCE TO RELATED APPLICATIONS

This application is the U.S. national stage of International Application No. PCT/US2019/059146, filed on Oct. 31, 2019 and titled "Laser and Mechanical Boring." PCT/US2019/059146 claims the benefit of U.S. Provisional Application No. 62/753,790, filed on Oct. 31, 2018, and titled "Laser and Mechanical Boring." The entirety of each of these applications is incorporated by reference.

BACKGROUND

Boring refers to the process of forming a bore through a material, such as earth (e.g., soil, rock, minerals, etc.). A variety of machines have been developed for boring. In one example, tunnel-type boring machines can be used to bore tunnels and include a front cutting head and trailing components. The head is rotated and advanced against the earth, chipping away portions of the earth. The excavated earth is transferred through holes in the head to a conveyor or other transportation mechanism for removal from the tunnel. In another example, auger or drill-type boring machines can be used to bore smaller tubular holes, such as sewage ducts and pipelines, and can include a helical screw blade. Rotation of the blade simultaneously cuts out the earth and removes it from the hole.

However, existing boring machines are subject to problems. In one aspect, tunnel boring machines have high upfront costs, being expensive to fabricate and transport. Furthermore, the active cutting time of tunnel boring machines is about 50%, at a maximum, due to the occurrence of breakdowns and the need to change heads, amongst others. In another aspect, auger boring machines can be limited in length (e.g., less than about 100 m) and, depending upon the screw blade, can be less effective for drilling relatively hard materials, such as rocks and minerals.

SUMMARY

In an embodiment, a method is provided. The method can include directing a laser beam at an exposed face of a bulk target in a longitudinal direction, where the laser beam can be configured to liquefy and/or gasify the target within the laser beam. The method can also include removing, by the laser beam, a channel of predetermined length and width within the target. The method can further include moving the laser beam in a closed loop of predetermined diameter to define a cut portion of the target laterally bounded by the closed loop, where a ligament of the cut portion can remain attached to the target. The method can additionally include separating the ligament from the target. The method can also include removing the cut portion from the target after separating the ligament to form a bore.

In another embodiment, the target can be earth.

In another embodiment, separating the ligament from the target can include rotating the cut portion with respect to the target and thereby fracturing the ligament.

In another embodiment, rotating the cut portion can include inserting a sleeve within the closed loop, the sleeve extending around a lateral outer surface of the cut portion, coupling the sleeve to at least a portion of the lateral outer surface the cut portion, and rotating the sleeve by an amount sufficient to fracture the ligament.

In another embodiment, coupling the sleeve to the lateral outer surface of the cut portion can include forming, by the laser beam, one or more notches within the target, where the one or more notches can extend inward from a lateral outer surface of the cut portion. Coupling the sleeve can also include inserting the sleeve within the closed loop, where sleeve extends around a lateral outer surface of the cut portion and includes at least one inwardly extending protrusion configured for receipt by a corresponding notch of the cut portion. Coupling the sleeve can further include applying, by the sleeve, a compressive force upon at least a portion of the lateral outer surface of the cut portion.

In another embodiment, a diameter of the sleeve can be smaller than the diameter of the cut portion at room temperature. The method can also include heating the sleeve to a predetermined temperature prior to insertion within the closed loop, where the predetermined temperature is configured to cause the diameter of the sleeve to expand to a value greater than the diameter of the cut portion. The method can further include inserting the heated sleeve within the closed loop. The method can additionally include cooling the sleeve while inserted within the closed loop, thereby causing the sleeve to contract into contact with at least a portion of the lateral outer surface of the cut portion.

In another embodiment, a diameter of the sleeve can be greater than the diameter of the cut portion at room temperature. The method can also include inserting the sleeve within the closed loop; and cooling the sleeve while inserted within the closed loop, thereby causing the sleeve to contract into contact with at least a portion of the lateral outer surface of the cut portion.

In another embodiment, separating the ligament from the target can include directing the laser beam at the ligament and forming a transverse cut extending through the ligament.

In another embodiment, directing the laser beam at the ligament can include positioning an optical element adjacent to the ligament and directing the laser beam at the optical element. The optical element can be configured such that a portion of the incident laser beam is reflected from the optical element towards the ligament.

In another embodiment, the method can include directing at least one secondary laser beams at one or more sidewalls of the cut portion, where the secondary laser beam can be configured to inhibit accumulation of the liquefied and/or gasified target upon the sidewalls.

In an embodiment, a method is provided. The method can include identifying a location for a pilot hole within a target. The method can also include identifying a path for a closed loop of predetermined diameter, the closed loop containing the identified location of the pilot hole. The method can further include forming one or more cuts within the target between the identified locations of the pilot hole and the closed loop. The method can additionally include directing a laser beam at an exposed face of the target in a longitudinal direction, where the laser beam is configured to liquefy and/or gasify the target within the laser beam. The method can also include forming the pilot hole. The method can additionally include moving the laser beam along the path of the closed loop to define a cut portion of the target laterally bounded by the closed loop, where a ligament of the cut portion remains attached to the target. The cut portion, the pilot hole, and the one or more cuts can define a plurality of sections, where each of the segments remain attached to the target by respective ligaments. The method can additionally include separating ligaments of respective sections of the cut portion from the target. The method can further include removing respective sections from the target to form a bore.

In another embodiment, the target is earth.

In another embodiment, the one or more cuts can be formed before at least one of the cut portion and the pilot hole.

In another embodiment, the one or more cuts can be formed after each of the cut portion and the pilot hole.

In another embodiment, separating the ligaments of respective sections from the target can include directing the laser beam at a respective ligament and forming a transverse cut extending through the ligament.

In another embodiment, directing the laser beam at the ligament can include positioning an optical element adjacent to the ligament, and directing the laser beam at the optical element. The optical element can be configured such that a portion of the incident laser beam is reflected from the optical element towards the ligament.

In another embodiment, removing respective sections from the target can further include inserting a sleeve between a selected one of the sections, the cut portion, and adjacent ones of the sections, compressively coupling the sleeve to at least a portion of the lateral outer surface the selected section, and removing the sleeve coupled to the selected section.

In another embodiment, an outer boundary of the sleeve can be smaller than an outer boundary of the selected section at room temperature. Compressively coupling the sleeve to at least a portion of the lateral outer surface the selected section can include heating the sleeve to a predetermined temperature prior to insertion of the sleeve, where the predetermined temperature is configured to cause the outer boundary of the sleeve to expand to a value greater than the outer boundary of the selected section. The compressive coupling can also include inserting the heated sleeve. The compressive coupling can additionally include cooling the sleeve while inserted such that the sleeve to contracts into contact with at least a portion of the lateral outer surface of the selected section.

In another embodiment, an outer boundary of the sleeve can be larger than an outer boundary of the selected section at room temperature. Compressively coupling the sleeve to at least a portion of the lateral outer surface the selected section can include inserting the sleeve and cooling the sleeve while inserted such that the sleeve to contracts into contact with at least a portion of the lateral outer surface of the selected section.

In another embodiment, the method can also include moving the laser beam between two edges of at least one of the plurality of sections to form a plurality of subsections.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Embodiments of the disclosure are directed to systems and methods that combine directed beam energy (e.g., a laser beam) with mechanical tools for boring into a surface of a material. Certain embodiments are described below in the context of earth boring. However, the disclosed embodiments can be used for forming bores in any target material without limit.

Figure 1A:
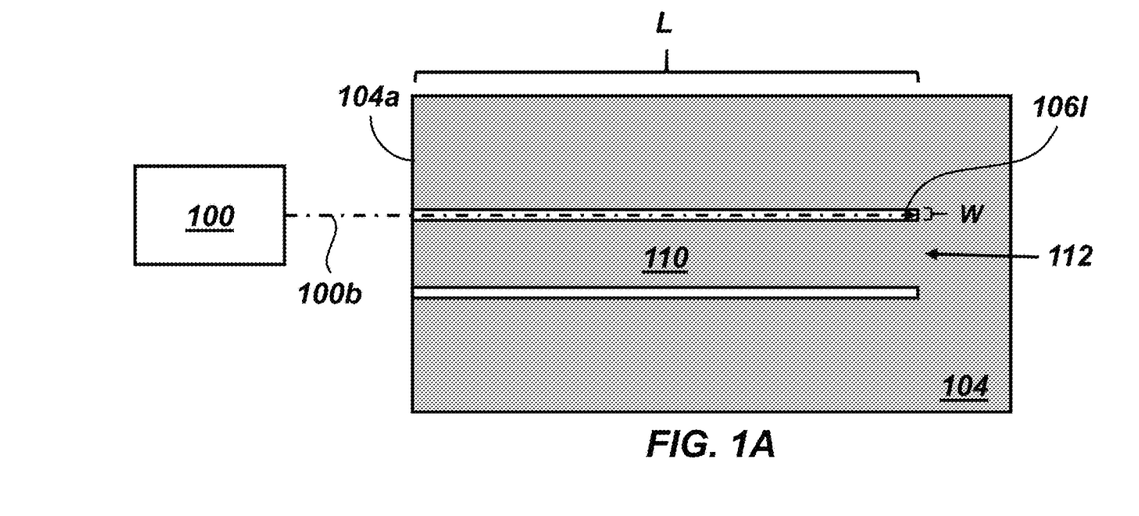
FIG. 1A is a diagram illustrating a side view of one exemplary embodiment of a laser configured to form longitudinal cuts in earth to define a cut portion of earth for removal.
Figure 1B:
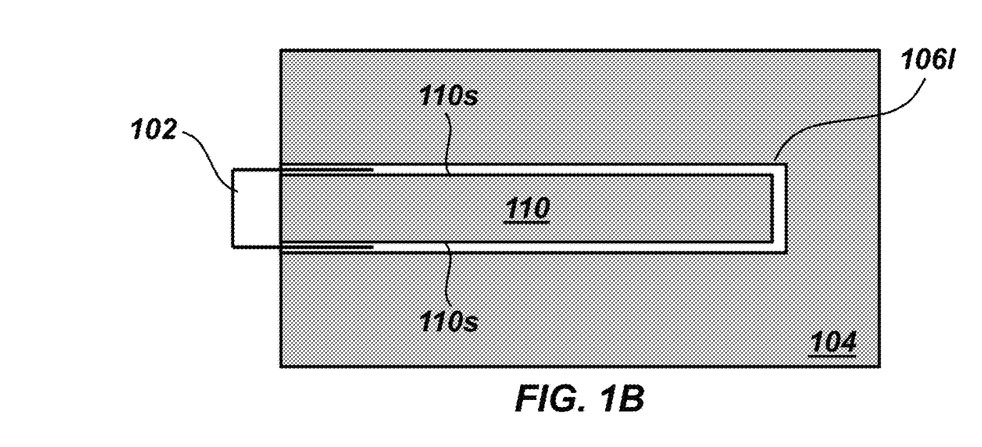
FIG. 1B is a diagram illustrating the cut portion of FIG. 1A and one exemplary embodiment of sleeve configured to detach the cut portion from a surrounding bulk of earth by mechanical force.
Figure 1C:
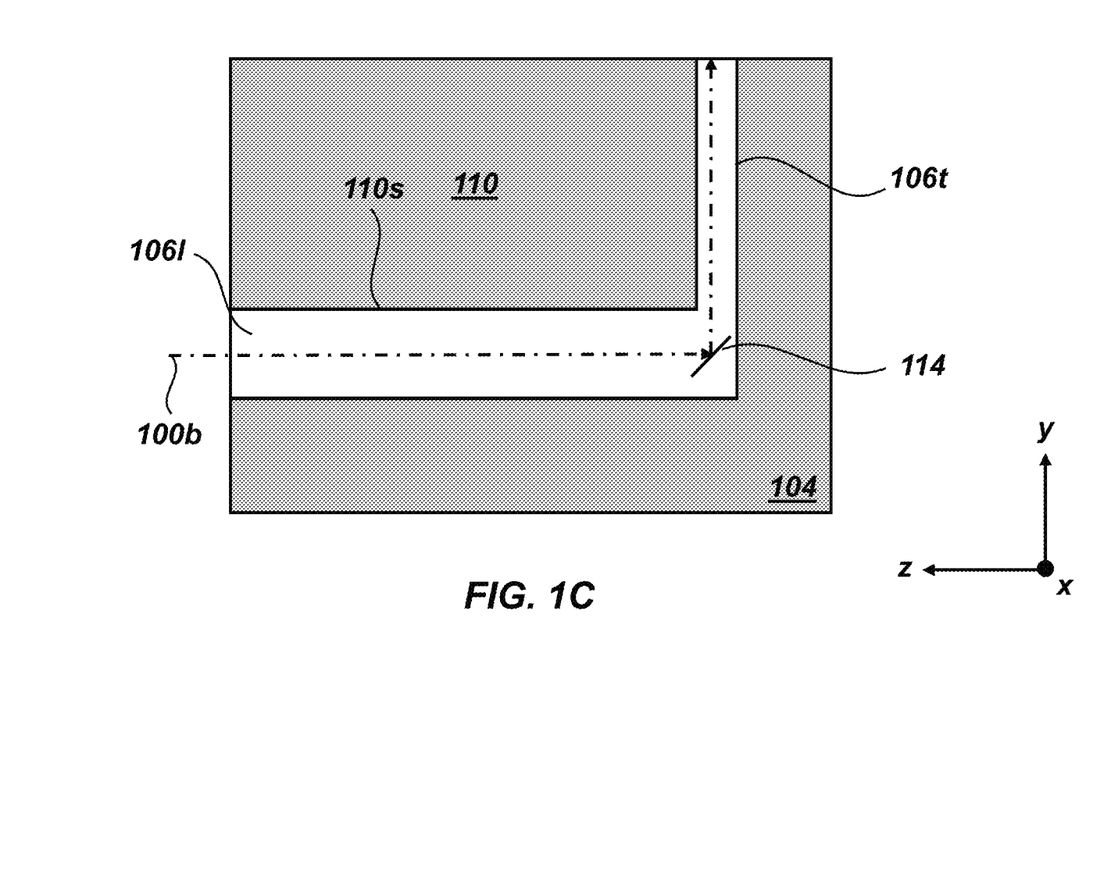
FIG. 1C is a diagram illustrating the cut portion of FIG. 1A and further illustrating the laser beam being directed to detach the cut portion of earth from a surrounding bulk of earth.

FIGS. 1A-1C illustrate a laser 100 and a sleeve 102 configured for use in boring through earth 104. The laser 100 can represent one or more lasers. However, for clarity, a single laser is illustrated. As shown, the laser 100 emits a beam 100b that is directed in a longitudinal direction to an exposed face 104a of the earth 104 (e.g., in a z-direction). The laser beam 100b can be of sufficient power to liquefy and/or gasify the earth 104 to make one or more longitudinal cuts 106l therein. A length L of the longitudinal cuts 106l can be a maximum distance penetrated by the laser 100 from the exposed face 104a. As an example, this maximum length L can be dependent upon parameters including one or more of a laser power, radial power distribution, width of the laser beam 100b, wavelength of the laser beam 100b, the width W of the longitudinal cut 106l, a diameter (D) of the longitudinal cut 106l (see FIG. 2A), characteristics of the earth 104 (e.g., composition, density, etc.), and the number of lasers.

As discussed in detail below, the laser beam 100b can moved in the x- and y-directions (e.g., by a focusing system, not shown) in a closed loop of predetermined diameter. The closed loop forms a boundary that defines a cut portion 110 of the earth 104 having lateral outer surface 110s. The closed loop can adopt any combination of curved lines, straight lines and intersections thereof (e.g., approximately circular, approximately polygonal, and combinations thereof. As discussed in detail below, the cut portion 110 is subsequently removed from the earth 104 to form a bore. While not shown, in alternative embodiments, two or more lasers can be used simultaneously allow for faster formation of the longitudinal cuts and/or achieve a higher length to width ratio.

Following definition of the cut portion 110 of earth 104 by the laser 100, the cut portion 110 is still attached to the bulk of the earth 104 by a ligament 112 opposite the exposed face 104 (e.g., adjacent to a terminal end of the longitudinal cuts 106l). Accordingly, at least one of the sleeve 102 and the laser 100 can be used to separate the ligament 112 from the earth 104.

In one embodiment, illustrated in FIG. 1B, the sleeve 102 can be inserted within the longitudinal cuts 106l (e.g., the closed loop) and coupled to the cut portion 110. As an example, the sleeve 102 can be coupled to at least a portion of the outer lateral surface of the cut portion 110. Once coupled to the cut portion 110, the sleeve 102 can be rotated to apply a shear force to the ligament 112 sufficient to cause the ligament 112 to fracture between the longitudinal cuts 106l, thereby detaching it from the earth 104.

In another embodiment, illustrated in FIG. 1C, the laser beam 100b can be directed at the ligament gasifying or liquefying the ligament 112 to form a transverse cut 106t. As an example, a mirror 114 can be positioned adjacent to the ligament 112 (e.g., at or near a terminal end of the longitudinal cuts 106l). Following placement of the mirror 114, the laser beam 110b can be directed at the mirror 114. The orientation of the mirror 114 can be configured such that a portion of the laser beam 100b reflected from the mirror 114 is incident upon the ligament.

In either case, after detaching the cut portion 110 from the surrounding earth 104, the cut portion 110 can be removed from the earth 104 to form a bore.

Figure 2A:
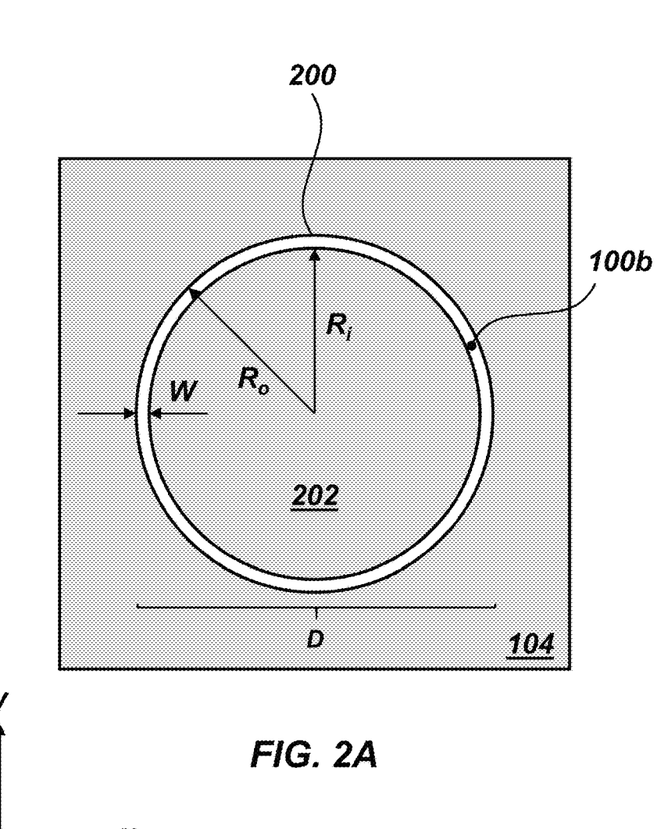
FIG. 2A is a diagram of a front view of a cylindrical cut formed in earth by the laser of FIG. 1A to define a cylindrical cut portion of earth for removal.

One exemplary process for boring by combining laser and mechanical mechanisms is illustrated in detail in FIGS. 2A-3C. FIG. 2A is a diagram of a front view of the earth 104 illustrating one embodiment of the one or more longitudinal cuts 106l in the form of a generally circular cut 200. As shown, the laser beam 100b can be directed in the x- and y-directions along a generally circular path, with the laser beam 100b extending into the page (e.g., the z-direction). The width W of the circular cut 200 can be as narrow as possible to minimize the amount of energy required for its formation. In an embodiment, the width W of the circular cut 200 can range from about 0.01 mm to about 10 mm. In other embodiments, the width W can range from about 1 mm to about 5 mm. While not shown, in alternative embodiments, cut portions having other geometric shapes can be formed having any number of curved and/or straight sides (e.g., ovals, squares, etc.).

Under circumstances where the laser beam 100b remains approximately parallel to the z-direction, the circular cut 200 defines a generally cylindrical cut portion 202 in the earth 104. In an embodiment, the cylindrical cut portion 202 can have an inner radius $R_i$ from the range from about 2 in to about 6 in. An outer radius $R_o$ can be approximately equal to the sum of the inner radius $R_i$ and the width W. In alternative embodiments, the laser beam can be angled with respect to the z-axis to form tapered cut portions (e.g., cones, etc.) having any desired dimension.

Figure 2B:
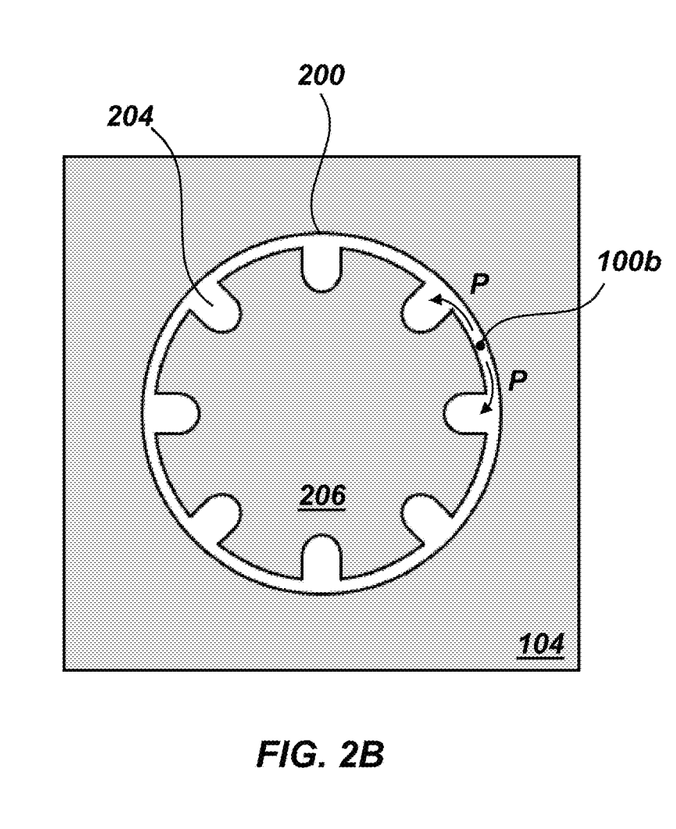
FIG. 2B is a diagram illustrating the cylindrical cut portion of FIG. 2A and grooves formed on an outer surface of the cylindrical cut portion to form a splined cylinder.

FIG. 2B further illustrates grooves 204 formed on the outer surface of the cylindrical cut portion 202 by the laser beam 100b to yield a splined cylinder 206. The grooves 204 can be placed at regular intervals. As shown, eight grooves 204 are present but any number of grooves can be formed without limit. While it has been assumed in the discussion above that the circular cut 200 is formed prior to the grooves 204, in alternative embodiments, this order can be reversed or the cylindrical cut and grooves can be formed in alternating fashion. In any case, because the grooves 204 are in fluid communication with the circular cut 200, gasified earth can be vented through either or both of the circular cut 200 and the grooves 204 to reduce undesirable back pressure (arrows P). In this manner, flow rate of gasified earth can be increased and/or less energy can be spent to remove the gasified earth.

Figure 2C:
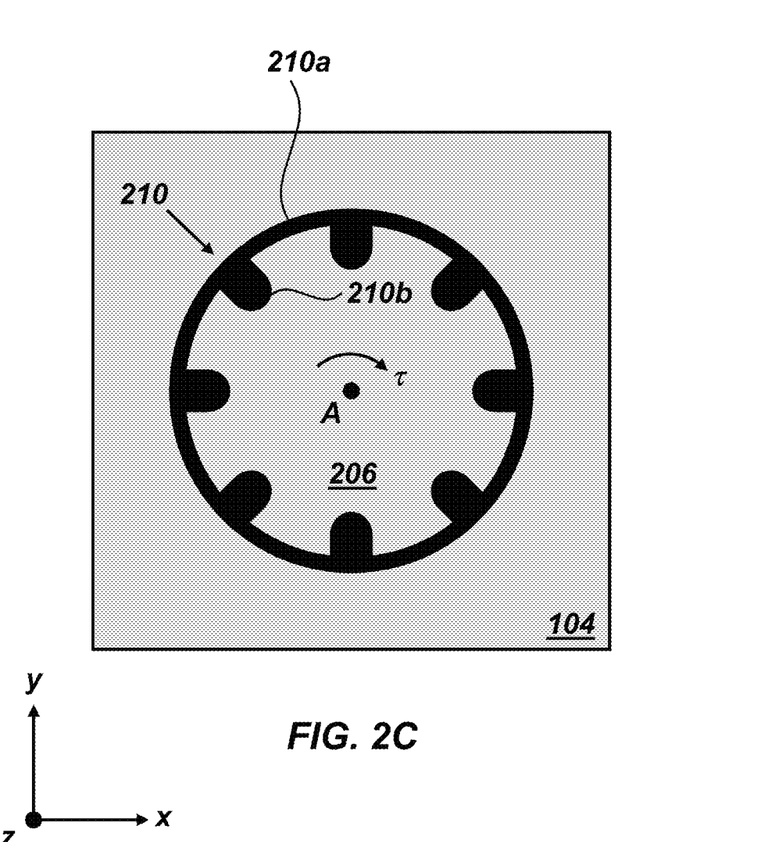
FIG. 2C is a diagram illustrating a notched sleeve positioned about the periphery of the splined cylinder of FIG. 2B.

The grooves 204 can be used in conjunction with the sleeve 102 to remove the ligament 112 that remains (e.g., a generally circular ligament). As shown in FIG. 2C, the sleeve 102 can be in the form of a notched cylindrical sleeve 210 having a cylindrical outer wall 210a and one or more inwardly directed notches 210b. The outer wall 210a can be dimensioned for receipt within the cylindrical cut portion 202 and the notches 210b can be dimensioned for receipt within the grooves 204. As further shown, the notched sleeve 210 includes a number of notches 210b equal to the number of grooves 204. However, in alternative embodiments (not shown), the notched sleeve can include fewer notches than there are grooves present in the splined cylinder.

The notched sleeve 210 can be configured to compressively couple with the splined cylinder 206. In one embodiment, the notched sleeve 210 can be formed with a diameter smaller than that of the splined cylinder 206 under normal operation conditions for the earth. In certain embodiments, the normal operating conditions can be about standard temperature and pressure (e.g., about room temperature (e.g., about 20-25° C.) and about atmospheric pressure (e.g., about 1 atm)). By heating the notched sleeve 210, its diameter can be expanded to an extent greater than that of the splined cylinder 206. Once expanded, notched sleeve 210 can then be inserted around the splined cylinder 206. Subsequently, the notched sleeve 210 can be cooled, causing it to contract into contact with the splined cylinder. Upon contacting the splined cylinder 206, the notched sleeve 210 exerts a compressive force on the splined cylinder 206. Concurrently, the notched sleeve is under tension.

In another embodiment, the notched sleeve 210 can be formed with a diameter larger than that of the splined cylinder under normal operation conditions for the earth. The notched sleeve 210 is inserted around the splined cylinder 206 and cooled to cause its diameter to contract into contact with the splined cylinder 206. As above, upon contacting the splined cylinder 210, the notched sleeve 206 exerts a compressive force on the splined cylinder 210 and the notched sleeve 210 is under tension. The notched sleeve 210 can be kept cooled as long as compressive coupling with the splined cylinder 206 is necessary.

Figure 2D:
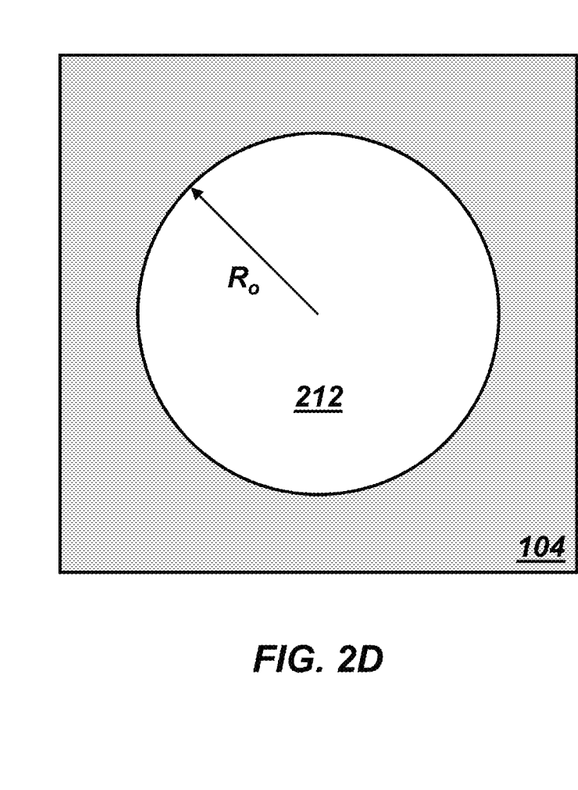
FIG. 2D is a diagram illustrating a bore formed in earth after removal of the splined cylinder of FIG. 2B.

In either case, once compressively coupled to the splined cylinder 206, the notched sleeve 210 is rotated about a longitudinal axis A of the splined cylinder 206. In this manner, a torque $\tau$ is applied to the splined cylinder 206, as shown in FIG. 2C. When the applied torque $\tau$ is sufficiently high, the ligament 112 fractures, detaching the splined cylinder 206 from the surrounding earth 104. Subsequently, the detached, splined cylinder 206 can be removed from the earth 104 (e.g., by retracting the notched sleeve 210), leaving behind a generally cylindrical bore 212 in the earth 104 that has a radius $R_0$, as shown in FIG. 2D.

Figure 3A:
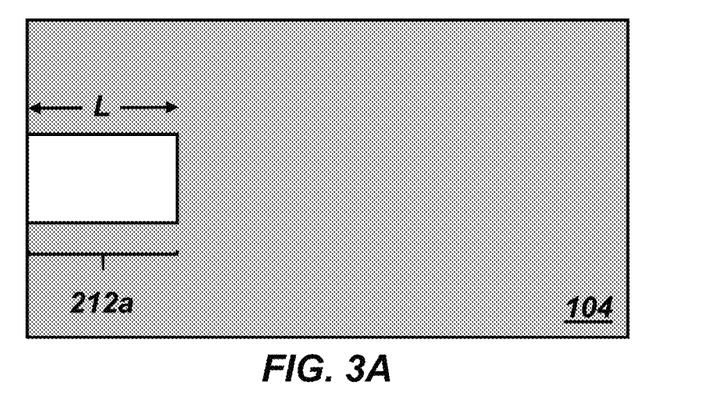
FIG. 3A is a diagram illustrating a side view of earth after removing of a first splined cylinder of length L to form a bore of depth 1 L.
Figure 3B:
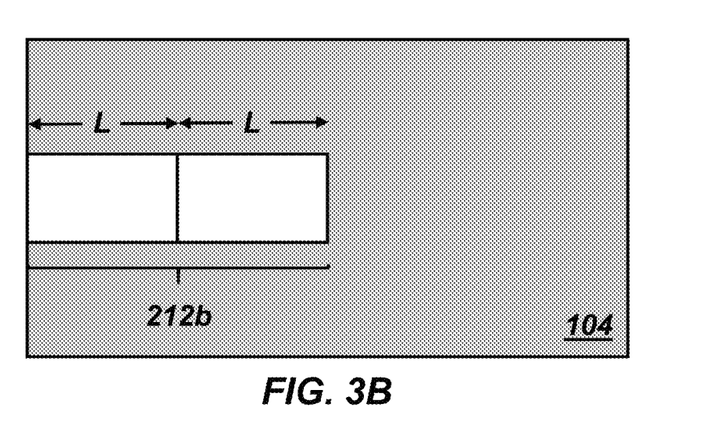
FIG. 3B is a diagram illustrating a side view of earth after removing of a second splined cylinder of length L to form a bore of depth 2 L.
Figure 3C:
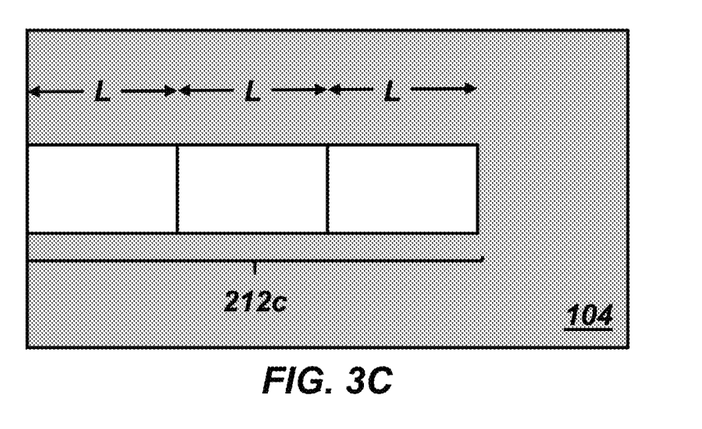
FIG. 3C is a diagram illustrating a side view of earth after removing of a third splined cylinder of length L to form a bore of depth 3 L.

The process of forming splined cylinders 206 of depth D, engaging the splined cylinders 206 with the notched sleeve 210, and removing the splined cylinders 206 can be repeated as needed to form a bore 212 of desired depth D. As an example, FIG. 3A illustrates a bore 212a of depth 1D after removing a single splined cylinder 206, while FIG. 3B illustrates a bore 212b of depth 2D after removing two splined cylinders 206, and FIG. 3C illustrates a bore 212c of depth 3D after removing three splined cylinders 206.

Figure 4A:
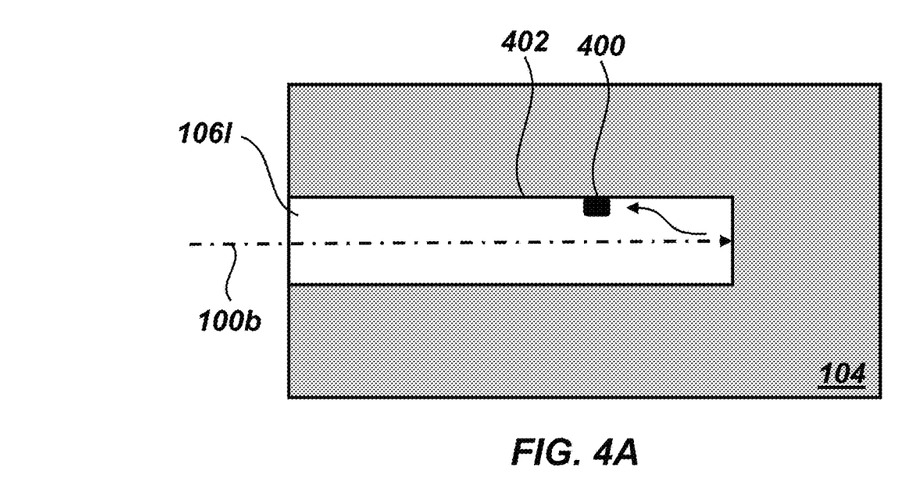
FIG. 4A is a diagram of a side view of a longitudinal cut formed by the laser of FIG. 1A illustrating accumulation of ejecta on sidewalls of the longitudinal cut.
Figure 4B:
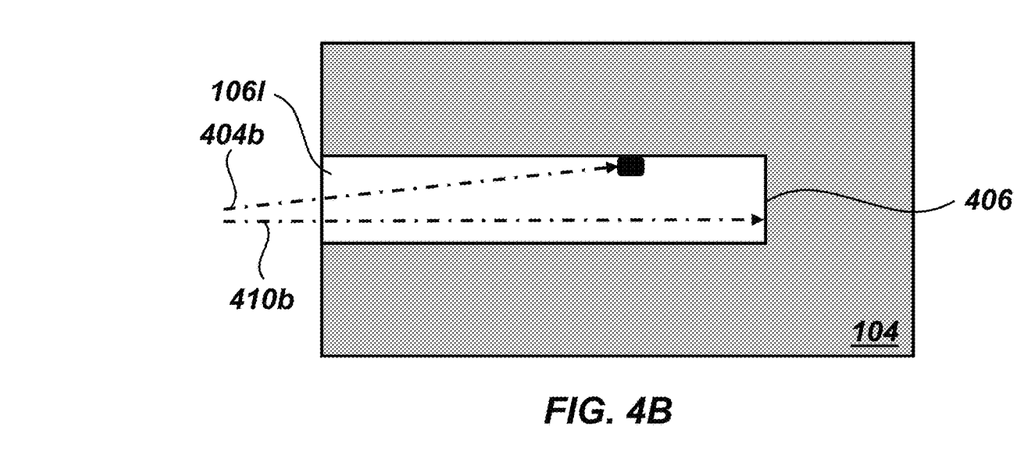
FIG. 4B is a diagram illustrating the longitudinal cut of FIG. 4A and embodiments of secondary laser beams configured to inhibit accumulation of ejecta on the sidewalls.

With further reference to FIG. 4A, liquefied or gasified ejecta generated by the laser beam 100b can redeposit (arrow) and form accumulations 400 on sidewalls 402 of the longitudinal cuts 106l under certain circumstances. Accordingly, as shown in FIG. 4B, one or more secondary laser beams (e.g., laser beam 404b) can be focused in the area of the accumulations 400 or focused approximately parallel to the sidewalls 402 and towards a back wall 406 of the longitudinal cuts 106l (e.g., laser beam 410b) to inhibit formation of accumulations 400. In certain embodiments, the energy distribution can be biased towards the sidewalls 402. The secondary beam 404b can be employed concurrently with the laser beam 100b, after use of the laser beam 100b, or combinations thereof.

Figure 5A:
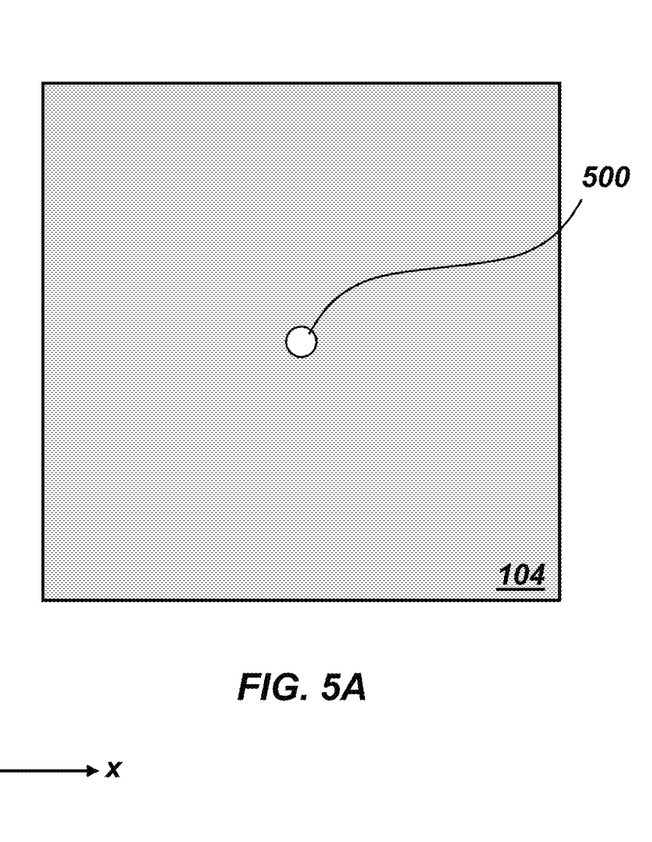
FIG. 5A is a diagram illustrating a front view of earth and a pilot hole formed therein.

An alternative process for boring by combining laser and mechanical mechanisms is illustrated in FIGS. 5A-5F. FIG. 5A is a diagram of a front view of the earth 104 illustrating a pilot hole 500 formed by the boring process discussed above with respect to FIGS. 2A-3C. In certain embodiments, the pilot hole 500 can have a diameter ranging from about 10 cm to about 20 cm. A closed loop 502 (e.g., generally circular cut of radius $R_o$) can made by the laser 100, approximately centered on the pilot hole 500. As discussed above, the closed loop can adopt any shape, as necessary.

Figure 5B:
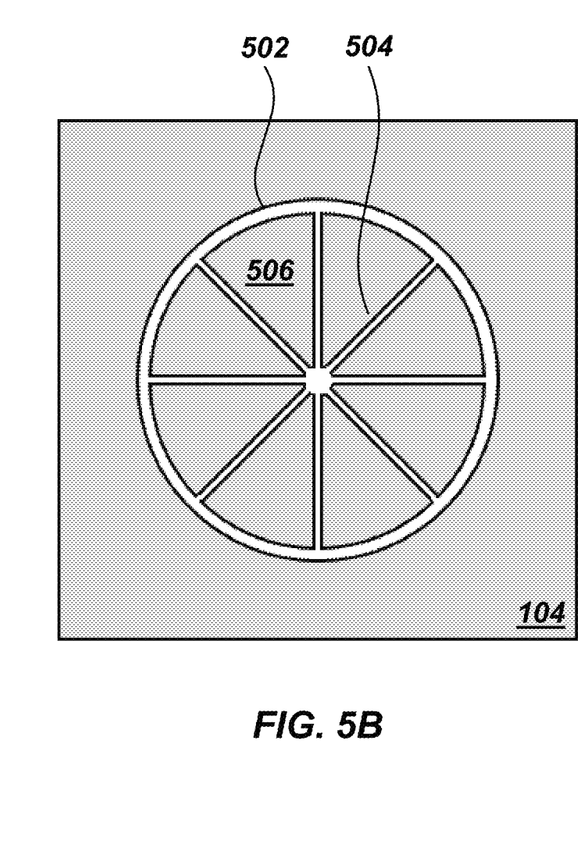
FIG. 5B is a diagram illustrating the pilot hole of FIG. 5B with circular and radial cuts made by the laser beam of FIG. 1A to form wedge-shaped segments extending outwards from the pilot hole.
Figure 5C:
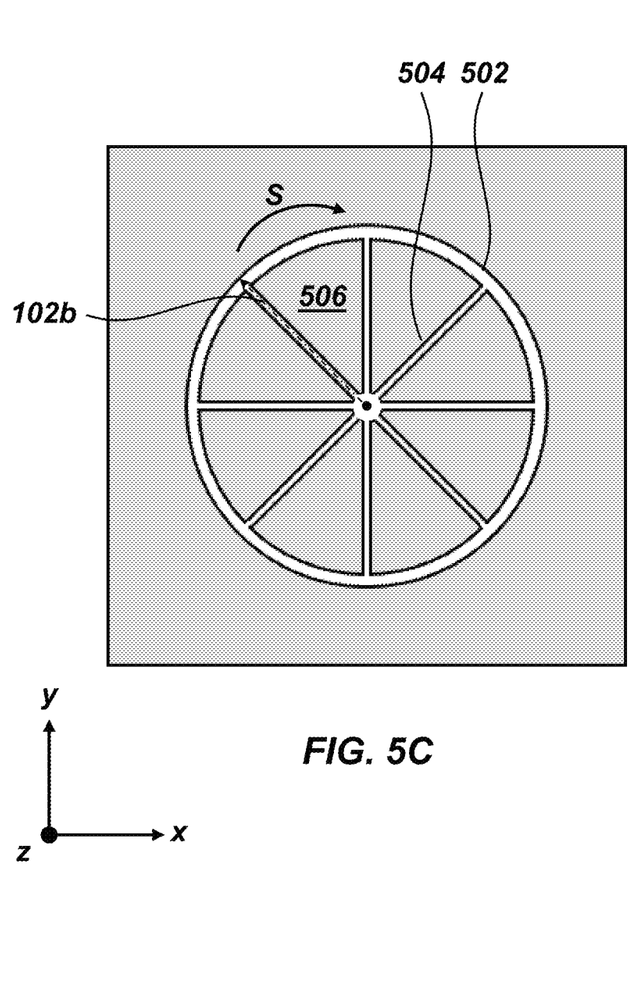
FIG. 5C is a diagram illustrating the laser beam of FIG. 1C sweeping behind the wedge-shaped segments of FIG. 5B.

One or more cuts 504 can be further made by the laser 100. In certain embodiments, the one or more cuts 504 can extend radially outward, from the pilot hole 500 to the closed loop 502. In this manner, sections 506 can be formed in the closed loop 502. However, it can be understood that the one or more cuts can adopt non-radial and/or curved shapes without limit.

The order of forming the pilot hole 500, the closed loop 502, and the one or more cuts 504 can be varied. In one embodiment, the pilot hole 500 is formed prior to at least one of the closed loop 502 and the one or more cuts 504. In another embodiment, the pilot hole 500 is formed after the closed loop 502 and the one or more cuts 504. In further embodiments, the location of the pilot hole 500, the closed loop 502, and the one or more cuts 504 can be identified prior to forming each of the same in the target 104.

The cuts 504 can be formed by the laser 100 in a variety of ways. In one embodiment, the laser 100 can make the cuts from the exposed face of the earth 104. In another embodiment, the laser beam 100b can be directed down the pilot hole 500 and angled to cut radially. Each approach can also be combined. As an example, the former approach can be used for relatively shallow cuts, while the latter can be suitable for deeper cuts and/or portions of segments.

Figure 5D:
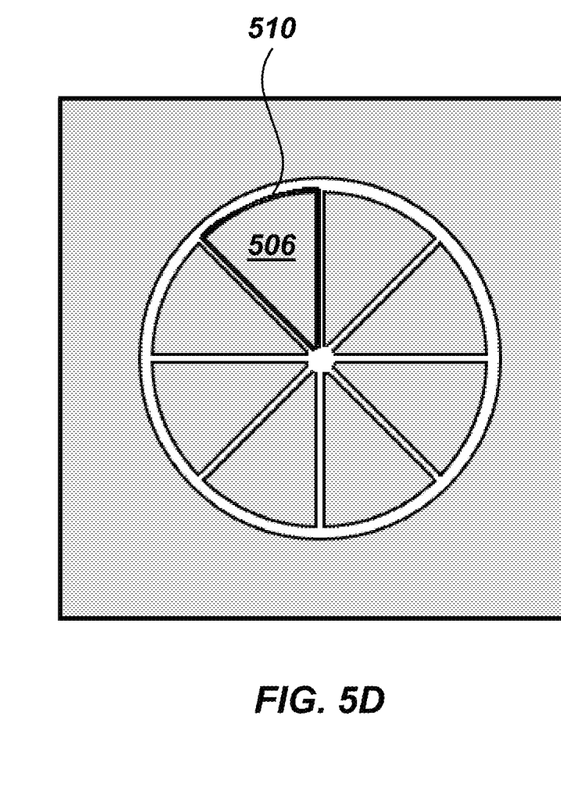
FIG. 5D is a diagram illustrating a wedge-shaped sleeve positioned about the periphery of one of the wedge-shaped segments of FIG. 5B.
Figure 5E:
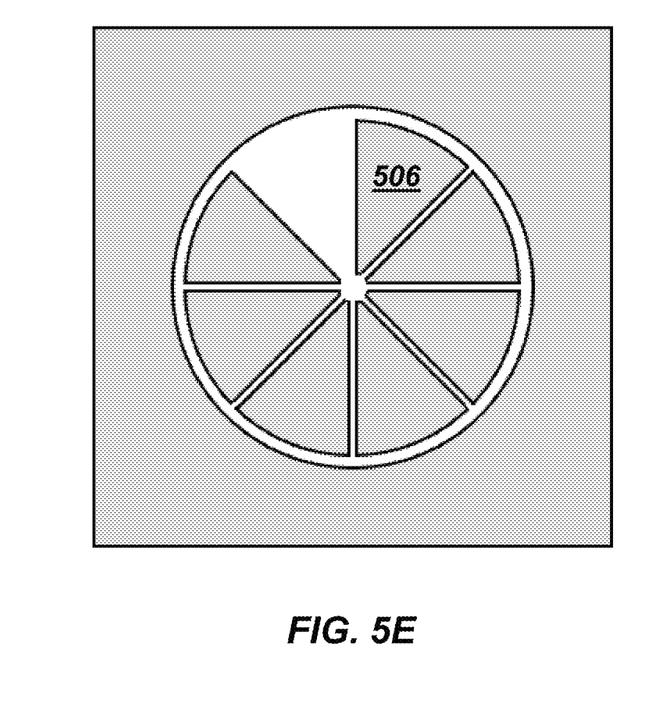
FIG. 5E is a diagram illustrating removal of one of the wedge-shaped segments of FIG. 5B from the earth.

Similar to the process discussed above in regards to FIGS. 2A-3C, each of the wedge shaped sections 506 remains attached to the earth 104 by a respective ligament 112 after being formed. To detach the ligaments from the earth 104, the laser beam 100b can be directed behind the wedge-shaped sections 506 (arrow S), as illustrated in FIG. 3C. In certain embodiments, the laser beam 100b can be directed by one or more optical elements (e.g., mirrors, prisms, and the like). In this manner, the ligament 112 is detached by liquefaction or gasification, rather than mechanically fracturing. Subsequently, a sleeve (e.g., a wedge-shaped sleeve 510) can be coupled to the detached wedge-shaped section 506 (FIG. 5D). This engagement can be compressive coupling achieved by heating or cooling the wedge shaped sleeve 510, as discussed above. Subsequently, the engaged wedge-shaped section 506 can be removed from the earth 104 (FIG. 5E).

Figure 5F:
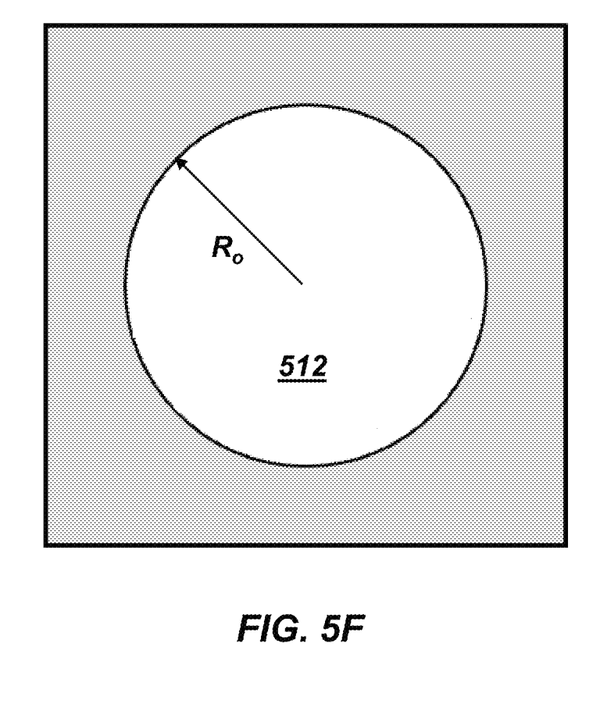
FIG. 5F is a diagram illustrating removal of each of the wedge-shaped segments of FIG. 5B from the earth to form a bore.
Figure 6A:
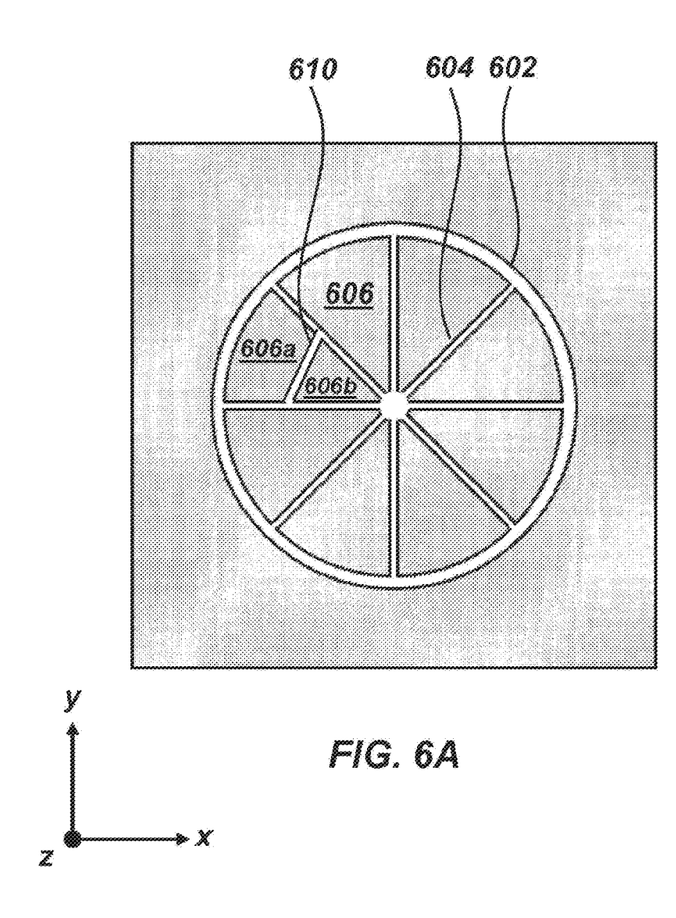
FIG. 6A is a diagram illustrating sub-sections formed from the wedge-shaped segments of FIG. 5B.
Figure 6B:
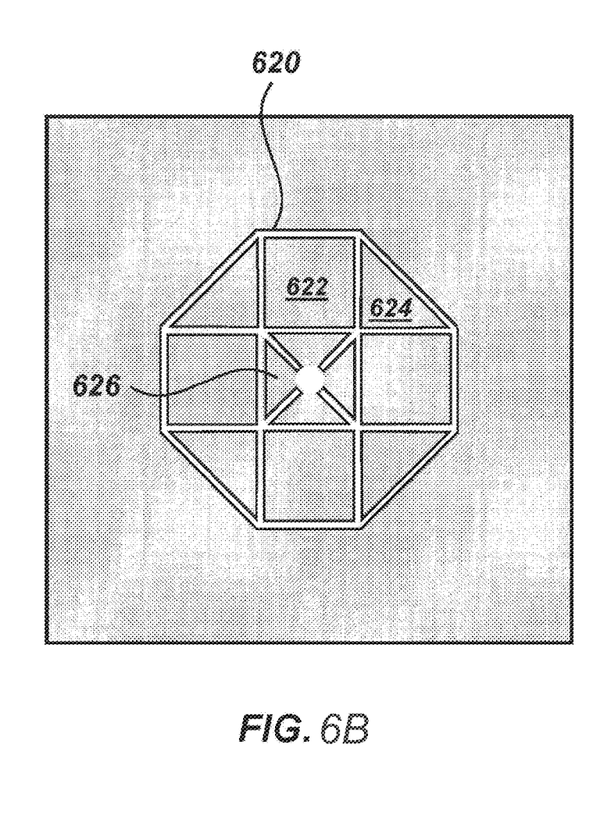
FIG. 6B is a diagram illustrating sub-sections formed in alternative embodiments employing non-radial and/or non-circular cuts.

The process of detaching and removing the wedge shaped sections 506 can be repeated until all the wedge shaped sections 506 are removed from the earth 104, leaving behind a generally cylindrical bore 512 in the earth 104 that has a radius $R_o$, as shown in FIG. 5F. In certain embodiments, one wedge-shaped section 506 at a time can be cut, detached from the earth 104, and removed. In further embodiments, one or more sections can be divided into smaller pieces, as illustrated in FIGS. 6A-6B. As shown in FIG. 6A, a generally circular cut 602 can be divided by cuts 604 into wedges 606, as discussed above. The wedges 606 can be further divided into a plurality of sub-sections having any desired shape. For example, at least one cut 610 can be made between opposing edges of the wedge-shaped section 606 to form sub-sections 606a, 606b. In alternative embodiments, not shown, the cuts can be straight or curved and extend between adjacent edges of the wedge-shaped section. In further embodiments, shown in FIG. 6B, cuts 620 that are neither circular nor radial can be employed to form a plurality of sections (e.g., 622, 624) and subsections (e.g., 626). This approach can facilitate formation of larger bores, where whole wedge-shaped sections 506 could be difficult to handle.

While the pilot hole 500 is discussed in the embodiments of FIGS. 5A-5F and 6A-6B, it can be understood that alternative embodiments of the disclosure can omit formation of the pilot hole 500.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method, comprising:
   directing a laser beam at an exposed face of a bulk target in a longitudinal direction, wherein the laser beam is configured to liquefy and/or gasify the target within the laser beam;
   removing, by the laser beam, a channel of predetermined length and width within the target;
   moving the laser beam in a closed loop of predetermined diameter to define a cut portion of the target laterally hounded by the closed loop wherein a ligament of the cut portion remains attached to the target;
   separating the ligament from the target by rotating the cut portion with respect to the target and thereby fracturing the ligament; and
   removing the cut portion from the target after separating the ligament to form a bore.

2. The method of claim 1, wherein the target is earth.

3. The method of claim 1, wherein rotating the cut portion comprises:
   inserting a sleeve within the closed loop, the sleeve extending around a lateral outer surface of the cut portion;
   coupling the sleeve to at least a portion of the lateral outer surface the cut portion; and
   rotating the sleeve by an amount sufficient to fracture the ligament.

4. The method of claim 3, wherein coupling the sleeve to the lateral outer surface of the cut portion comprises:
   forming, the laser beam, one or more notches within the target, the one or more notches extending inward from a lateral outer surface of the cut portion;
   inserting the sleeve within the closed loop, the sleeve extending around a lateral outer surface of the cut portion and including at least one inwardly extending protrusion configured for receipt by a corresponding notch of the cut portion; and
   applying, by the sleeve, a compressive force upon at least a portion of the lateral outer surface of the cut portion.

5. The method of claim 4, wherein a diameter of the sleeve is smaller than the diameter of the cut portion at room temperature and the method farther includes:
   heating the sleeve to a predetermined temperature prior to insertion within the closed loop, wherein the predetermined temperature is configured to cause the diameter of the sleeve to expand to a value greater than the diameter of the cut portion;
   inserting the heated sleeve within the closed loop;
   cooling the sleeve while inserted within the closed loop and causing the sleeve to contract into contact with at least a portion of the lateral outer surface of the cut portion.

6. The method of claim 4, wherein a diameter of the sleeve is greater than the diameter of the cut portion at room temperature and the method further includes:
   inserting the sleeve within the closed loop; and
   cooling the sleeve while inserted within the closed loop and causing the sleeve to contract into contact with at least a portion of the lateral outer surface of the cut portion.

7. The method of claim 1, further comprising, prior to the step of separating the ligament from the target, the step of directing the laser beam at the ligament and forming a transverse cut extending through the ligament.

8. The method of claim 7, wherein directing the laser beam at the ligament comprises:
   positioning an optical element adjacent to the ligament; and
   directing the laser beam at the optical element;
   wherein the optical element is configured such that a portion of the incident laser beam is reflected from the optical element towards the ligament.

9. The method of claim 1, wherein the method further comprises directing at least one additional laser beam at one or more sidewalk of the cut portion, the at least one additional laser beam being configured to inhibit accumulation of the liquefied and/or gasified target upon the side walls.

10. A method, comprising:
    identifying a location for a pilot hole within a target;
    identifying a path for a closed loop or predetermined diameter, the closed loop containing the identified location of the pilot hole;
    forming one or more cuts within the target between the identified locations of the pilot hole and the closed loop;
    directing a laser beam at an exposed face of the target in a longitudinal direction, wherein the laser beam is configured to liquefy and/or gasify the target within the laser beam;
    forming the pilot hole;
    moving the laser beam along the path of the closed loop to define a cut portion of the target laterally bonded by the closed loop, wherein a ligament of the cut portion remains attached to the target;
    wherein the cut portion, the pilot hole, and the one or more cuts define a plurality of sections, wherein each of the plurality of sections remain attached to the target by respective ligaments;
    separating ligaments of respective sections of the cut portion from the target by inserting a sleeve between a selected one of the sections, the cut portion, and adjacent ones of the sections; compressively coupling the sleeve to at least a portion of the lateral outer surface the selected section; and removing the sleeve coupled to the selected section, thereby removing respective sections from the target to form a bore.

11. The method of claim 10, wherein the target is earth.

12. The method of claim 10, wherein the one or more cuts are formed before at least one of the cut portion and the pilot hole.

13. The method of claim 10, wherein the one or more cuts are formed after each of the cut portion and the pilot hole.

14. The method of claim 10, further comprising, prior to the step of separating the ligaments of respective sections from the target, the step of directing the laser beam at a respective ligament and forming a transverse cut extending through the ligament.

15. The method of claim 14, wherein directing the laser beam at the ligament comprises:

positioning an optical element adjacent to the ligament; and directing the laser beam at the optical element;

wherein the optical element is configured such that a portion of the incident laser beam is reflected from the optical element towards the ligament.

16. The method of claim 10, wherein an outer boundary of the sleeve is smaller than an outer boundary of the selected section at room temperature, and wherein compressively coupling the sleeve to at least a portion of the lateral outer surface the selected section comprises:

heating the sleeve to a predetermined temperature prior to insertion of the sleeve, wherein the predetermined temperature is configured to cause the outer boundary of the sleeve to expand to a value greater than the outer boundary of the selected section; inserting the heated sleeve; and cooling the sleeve while inserted such that the sleeve to contracts into contact with at least a portion of the lateral outer surface of the selected section.

17. The method of claim 10, wherein an outer boundary of the sleeve is larger than an outer boundary of the selected section at room temperature, and wherein compressively coupling the sleeve to at least a portion of the lateral outer surface the selected section comprises:

inserting the sleeve; and cooling the sleeve while inserted such that the sleeve to contracts into contact with at least a portion of the lateral outer surface of the selected section.

18. The method of claim 10, further comprising moving the laser beam between two edges of at least one of the plurality of sections to form a plurality of subsections.

* * * * *